Figure 1:
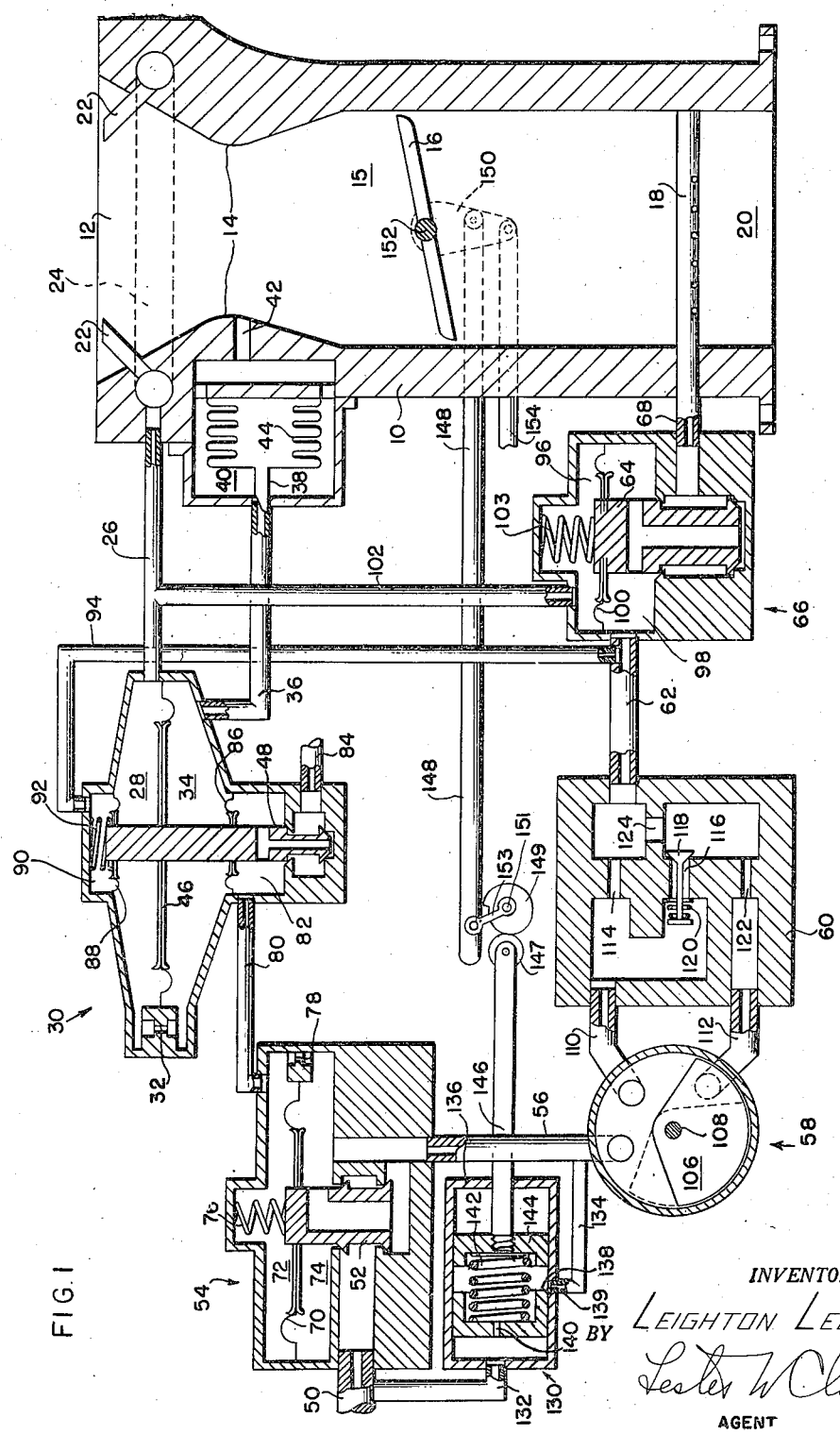

March 22, 1949.  L. LEE, II  2,465,159
IDLE CONTROL
Filed April 23, 1946  3 Sheets-Sheet 1

INVENTOR.
LEIGHTON LEE II
BY Lester W Clark
AGENT

INVENTOR.
LEIGHTON LEE II
BY Lester W Clark
AGENT

March 22, 1949.  L. LEE, II  2,465,159
IDLE CONTROL

Filed April 23, 1946  3 Sheets-Sheet 3

ENGINE DRIVEN SUPERCHARGER

INVENTOR.
LEIGHTON LEE II
BY Lester W Clark
AGENT

Patented Mar. 22, 1949

2,465,159

UNITED STATES PATENT OFFICE 2,465,159

IDLE CONTROL

Leighton Lee, II, Rocky Hill, Conn., assignor, by mesne assignments, to Niles-Bement-Pond Company, West Hartford, Conn., a corporation of New Jersey Application April 23, 1946, Serial No. 664,410

29 Claims. (Cl. 123—119)

The present invention relates to fuel supply systems for internal combustion engines and especially to such systems which are adapted to control the fuel flow under engine idling conditions.

In carburetors and other fuel supply systems for internal combustion engines it is customary to control the fuel flow by regulating the pressure differential across a fixed fuel metering orifice. If the fixed orifice is sufficiently large to take care of the fuel flows at high engine power outputs, then the fuel pressure differential across the orifice at low fuel flows, such as are encountered under engine idling conditions, are so small that it becomes difficult to properly regulate the fuel flow. Therefore it becomes necessary to set the minimum fuel flow at a rather high value, and to idle the engine at a relatively high speed.

It is an object of the present invention to provide an improved fuel flow control mechanism for an internal combustion engine, including improved mechanism for controlling the fuel flow under engine idling conditions.

Another object is to provide an improved idle fuel control system in which a small metering orifice is used to regulate the fuel flow under idle conditions in place of a larger metering orifice used under normal power output conditions.

Another object is to provide an improved idle fuel control system wherein the rate of flow of fuel under idle conditions may be controlled more accurately than in previous systems.

Another object is to secure greater accuracy of control of fuel flow in a carburetor having a small fixed orifice for metering idle fuel and a larger fixed orifice for metering the fuel flow under power output conditions, by so proportioning the orifices that the fuel pressure differential applied across the small idle orifice is greater than the fuel pressure differential applied across the larger orifice under power output conditions.

A further object of the invention is to provide improved means for controlling the fuel flow thru the small idle metering orifice.

Another object is to provide an improved idle fuel control system using a small metering orifice with a relatively high fuel pressure differential across it, under idle conditions, and means providing a smooth change-over to a larger metering orifice used under normal power output conditions.

Another object is to provide improved means for controlling the flow of fuel to an internal combustion engine under idling conditions in response to the position of the throttle.

Another object is to provide an improved idle fuel control system which responds to air density.

Another object is to provide an improved idle fuel control system which responds to a condition indicative of the speed of the engine.

A further object is to provide an improved idle fuel control system which is adaptable either to carburetor type fuel supply systems or to direct injection type systems.

Figure 2:
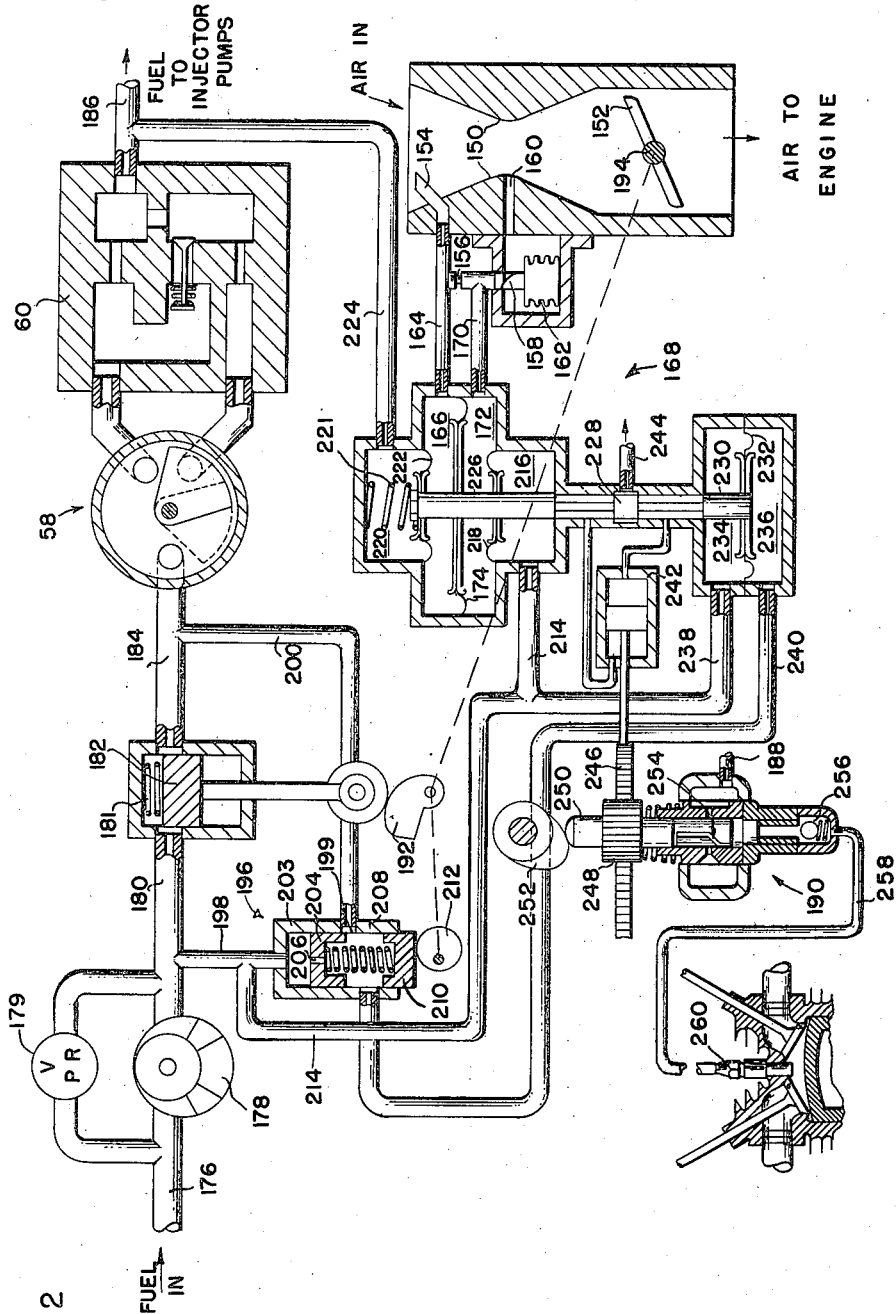
Figure 3:
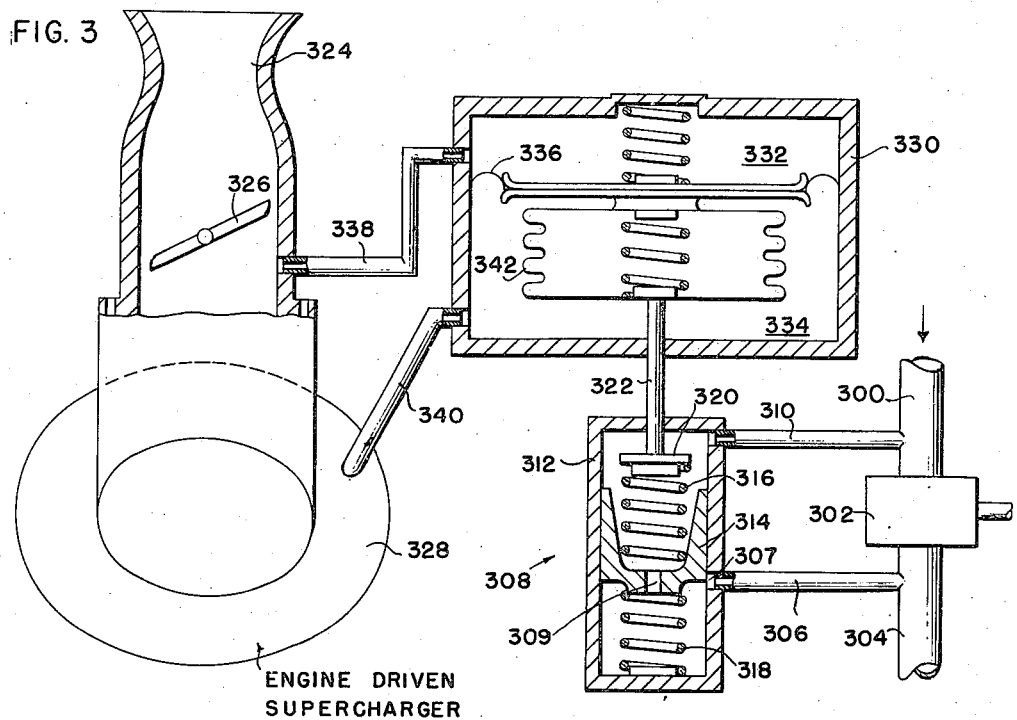
Figure 4:
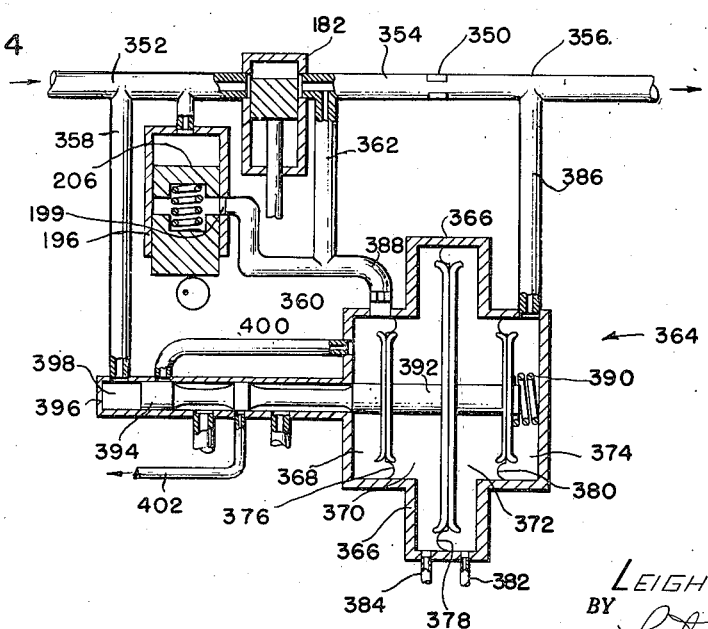

Other objects and advantages of my invention will become apparent from a consideration of the appended specification, claims and drawings, in which Figure 1 illustrates, somewhat diagrammatically, a carburetor for an internal combustion engine including an idle fuel control system constructed in accordance with the principles of my invention, Figure 2 illustrates, somewhat diagrammatically, a direct fuel injection control system embodying my improved idle fuel control, Figure 3 illustrates a modified form of idle fuel control which may be used with either the carburetor of Figure 1 or the direct injection system of Figure 2, and Figure 4 illustrates a modified form of control for a direct injection fuel control system.

Figure 1

Referring to Figure 1, there is shown a body 10 of a carburetor for an aircraft type internal combustion engine. Air enters the carburetor body 10 at an inlet 12 and flows thru a Venturi restriction 14 and a passage 15, past a throttle 16 and a fuel discharge nozzle 18 to an outlet 20. A supercharger may be provided between outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the venturi is constant, this pressure differential may be taken as a measure of the volume of air flowing thru the passage per unit time.

In order to obtain a pressure differential varying as a function of the mass of air per unit time flowing thru the venturi 14, the pressure differential between entrance 12 and the throat of venturi 14 is utilized to create an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12, thru tubes 22, a passage 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, and thru a conduit 42 to the throat of venturi 14.

In the carburetor of Figure 1, the total pressure differential between the entrance 12 and the throat of venturi 14 is a measure of the volume of air entering the carburetor per unit time. In the secondary air passage previously traced, this total air pressure differential is divided into two component pressure drops, one across the restriction 32 and the other across valve 38. The valve 38 is moved toward open position as the air pressure increases and toward closed position as the air pressure decreases. If the volume of air flowing per unit time thru passage 15 remains constant while its density decreases, then the mass of air flowing is decreased, but the pressure differential set up by the venturi 14 remains constant. However, the movement of valve 38 toward closed position causes the component pressure drop across valve 38 to increase, and the component pressure drop across restriction 32 to decrease proportionately, reflecting the decrease in the mass of air flowing per unit time. By proper design of valve 38, the pressure drop across restriction 32 may be made to vary substantially in accordance with the mass of air flowing thru passage 15. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. Under power output operating conditions it flows thru a conduit 50, a valve 52 in a pressure regulator generally indicated at 54, a conduit 56, a mixture control unit generally indicated at 58, a jet system 60, a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, and chamber 82 in the pressure meter 30, past the valve 48 to a drain conduit 84. Drain conduit 84 may be connected to the fuel tank or to some other suitable source of relatively low, substantially constant pressure.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54.

The position of diaphragm 70 and valve 52 is determined by the balance between the pressure in chamber 74 acting in a valve closing direction and the spring 76 plus the pressure in chamber 72 acting in a valve opening direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60. For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due, for example, to operation of the throttle or to variations in engine speed, from reaching the downstream side of the jet system and affecting the fuel flow.

The pressure regulator includes a pair of expansible chambers 96 and 98 separated by a flexible diaphragm 100, which is attached at its center to the valve 64. A spring 103 biases the valve 64 toward closed position. The chamber 96 is connected thru a conduit 102 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 106 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by an enrichment valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel-to-air ratio under heavy load conditions.

The idle fuel control is generally indicated at 130. This control has an inlet conduit 132 leading from the fuel supply conduit 50 and an outlet conduit 134 leading to the conduit 56. It may therefore be seen that the system including conduit 132, idle control 130 and conduit 134 bypasses the valve 52. The idle control 130 includes a cylinder 136 in which a piston 138 is movable. An orifice 140 is located at the center of piston 138. A spring 142 biases the piston 138 for movement to the left, as it appears in the drawing. The right end of spring 142 engages a retainer 144 fastened to a rod 146. The end of rod 146 carries a roller follower 147 operated by a cam 149. Cam 149 is fixed to a shaft 151 turned by an arm 153 which is connected by a link 148 to an arm 150 fixed on the shaft 152 of throttle 16. Another link 154 connected to arm 150 permits manual manipulation of the throttle.

Whenever the throttle is opened beyond a range of positions near its closed position, which is termed the "idling range," then the retainer 144 is moved to the left far enough so that the piston 138 completely opens the discharge port 139 in cylinder 136, which port leads to the outlet conduit 134. A flow then takes place thru conduit 132, orifice 140, port 139 and conduit 134 into conduit 56.

The position of piston 138 is determined by the balance between the force of spring 142 acting to the left and a force due to the fuel pressure drop across orifice 140 acting to the right. As throttle 16 moves toward its closed position, the retainer 144 is moved to the right. The force of spring 142 acting to the left on piston 138 is thereby reduced, allowing it to move to the right. As the piston moves to the right, it increasingly obstructs port 139, thereby reducing the flow thru restriction 140 and the pressure drop across it. This movement of the piston to the right, and the accompanying reduction in the flow and the pressure drop continue until the pressure drop just balances the force of spring 142. It may therefore be seen that the force of spring 142 sets the flow thru orifice 140. The force of spring 142 is in turn set by cam 149 as a predetermined function of the throttle position, so that the fuel flow thru orifice 140 is likewise controlled as a function of the throttle position.

The air flow obtained at any given throttle position varies with the engine speed, which in turn varies with the load on the engine. When there is no load on the engine, the air flow varies as a predetermined function of throttle position, if constant air density is assumed. If the applicant's idle control 130 were omitted, the pressure meter 30 and regulator 54 would cooperate to produce a given fuel-air ratio regardless of the throttle position. When the applicant's idle control 130 is used, cam 149 is contoured so that for any given throttle position in the idle range, the fuel flow thru restriction 140 is somewhat greater than that which would be required to maintain that given fuel-air ratio at the air flow corresponding to no load idling of the engine. Therefore, at any given throttle position in the idle range, if the air flow is equal to or less than the air flow corresponding to no load idle at the given throttle position, then the pressure in chamber 74 due to the flow thru restriction 140 is greater than that which would be maintained by regulator 54 at that air flow. Valve 52 of regulator 54 is therefore closed by the pressure in chamber 74 acting on diaphragm 70, and the fuel flow is controlled only by the throttle position. If, however, the air flow is substantially greater than the air flow corresponding to no load idle at the given throttle position, then the pressure meter 30 responds to the increased air flow to increase the pressure in chamber 72. This increased pressure in chamber 72 prevents the pressure in chamber 74 due to flow thru restriction 140 from closing valve 52. The fuel flow to the engine is then determined by the pressure meter 30 and regulator 54 in the normal manner.

Such a combination of conditions, i. e., throttle closed or nearly so, but air flow increased beyond the no load idle air flow at the given throttle position, may occur in an aircraft during a descent when the throttle is in its idle position but the engine is being driven at high speed by the "windmilling" of the propeller.

In previous carburetors of the general type disclosed herein, the idle control always regulates the fuel flow at "idle range" throttle positions regardless of the actual air flow. By means of the present invention, the idle control is only effective when the throttle is in the idle range and the air flow is also in the low range corresponding to engine idling conditions.

In the previous carburetors, the idle control may cause the mixture to "lean out," during a descent with throttle closed or nearly closed, so much that the engine cannot continue to run by itself on that lean mixture if the driving force due to the propeller is removed. When such "leaning out" conditions are present, and it becomes necessary to level off the aircraft after the descent, the engine cannot pick up its load smoothly, and may even stall due to insufficient fuel. Such stall or failure to accelerate rapidly may be very dangerous, as it is particularly apt to occur when the aircraft is landing or during an approach to a landing, and consequently may cause a crash due to power failure.

The present invention overcomes such dangerous possibilities by preventing the "leaning out." The engine is always operating with a normal fuel-air ratio when the air flow is greater than that encountered in the idle range, even tho the throttle may be in the idle range. The engine is therefore able to accelerate rapidly, since its fuel supply is adequate to maintain it in operation when the propeller suddenly ceases to drive it.

Altho my invention is not necessarily so limited, I prefer to choose the proportions of orifice 140 and spring 142 so that a higher fuel pressure differential exists across orifice 140 when that orifice is metering the fuel than exists across jet system 60 when the jet system is metering the fuel. By employing such a high pressure differential, a given variation in the contour of cam 149 may be made to produce a corresponding variation in the fuel flow more accurately than if a lower pressure differential were used.

It may therefore be seen that under idling conditions, the rate of flow of fuel to the engine is determined only by the position of the throttle. The metering orifice 140 is so much smaller than the orifices 114, 122, that the latter can handle the quantity of fuel passed by orifice 140 without any substantial pressure drop across them.

Figure 2

Figure 2 illustrates an idle fuel control system for a fuel supply system of the direct injection type.

Air flows to the engine thru a venturi 150 and past a throttle 152. The air differential pressure set up in the venturi is used to create a flow of air thru a secondary air passage leading from an impact tube 154 thru a fixed restriction 156, a valve 158 and a passage 160 to the throat of venturi 150. The valve 158 is operated by a bellows 162 in the same manner as valve 38 is operated by bellows 44 in Figure 1. As explained in connection with Figure 1, the venturi 150 and the bellows 162 cooperate to produce across the restriction 156 a pressure differential which is a measure of the mass of air flowing to the engine per unit time. The pressure upstream from orifice 156 is communicated thru a conduit 164 to a chamber 166 in a control device generally indicated at 168. The pressure downstream from restriction 156 is communicated thru a conduit 170 to a chamber 172 in the control device 168. The chambers 166 and 172 are separated by a flexible diaphragm 174.

Fuel flows to the engine from a tank (not shown) thru a conduit 176, thru a pump 178, which may be of the well-known rotary sliding vane type, a conduit 180, past a valve 182, thru a conduit 184, a mixture control unit 58 and a jet system 60, to a conduit 186. The mixture control 58 and the jet system 60 are the same as the corresponding elements of Figure 1 and need not be further described. From the conduit 186, the fuel is distributed thru individual conduits, one of which is shown at 188, to a plurality of injector pumps 190, one of which is provided for each cylinder of the engine.

The valve 182 is biased open by a spring 181 and is operated by a cam 192, which is connected to the shaft 194 of throttle 152. An idle control 196, which is generally the same as idle control 130 of Figure 1 is provided with an inlet conduit 198 connected to conduit 180 and an outlet conduit 200 connected to conduit 184. It may be seen that the idle control 196 by-passes the valve 182 in the same manner that idle control 130 by-passes valve 52 in Figure 1.

The idle control 196 includes a cylinder 203, a piston 204 having an orifice 206 extending thru it, a spring 208, and a retainer 210. The retainer 210 is positioned by a cam 212 connected to the throttle shaft 194. Conduit 214 leads from the conduit 198 to a chamber 216 in the control device 168. Chamber 216 is separated from the chamber 172 by a diaphragm 218. Another chamber 220 is provided in the control device 168 which is separated from chamber 166 by a diaphragm 222. The chamber 220 is connected thru a conduit 224 to the conduit 186 on the downstream side of the jet system.

The diaphragms 222, 174 and 218 are connected at their centers to the stem 226 of a spool valve 228. The lower end of valve 228 is connected by a stem 230 to a diaphragm 232. The diaphragm 232 separates a pair of chambers 234 and 236. Chamber 234 is connected thru a conduit 238 to the conduit 214, and chamber 236 is connected thru a conduit 240 to the cylinder 203 at a point downstream from orifice 206. The spool valve 228 may be of generally conventional structure, and controls a hydraulic servo-motor 242. Operating fluid for the servo-motor is provided by the fuel itself in either chamber 216 or chamber 234. Fluid discharged from the servo-motor passes thru an outlet conduit 244 back to the fuel tank or to some other suitable place of disposal. The servo-motor 242 positions a rack 246 which engages the pinions 248 of a number of injector pumps, the one for the pumps being shown at 190.

The pump 190 includes a plunger 250 reciprocated by an engine driven cam 252. The plunger 250 is provided with a helical groove 254 of conventional form, which cooperates with a pressure relief port to vary the delivery per stroke of the plunger in accordance with the angular position of the plunger. The pump 190 delivers fuel thru a check valve 256 and conduit 258 and a nozzle 260 to one of the cylinders of the engine. If desired, the nozzle 260 may alternatively be located so as to discharge into the intake manifold just outside the cylinder rather than into the cylinder itself.

Operation of Figure 2

When the engine is operating in its power output range, the throttle is sufficiently wide open so that the cam 192 allows the valve 182 to open under the influence of spring 181. Under these conditions, the pressure in chamber 234 is the same as that in chamber 236 and the valve 228 is operated only in accordance with the pressure differentials applied to the diaphragms 222, 174 and 218. As previously explained, the pressure differential acting downwardly on diaphragm 174 is a measure of the rate of flow of air to the engine. The pressure differential acting on diaphragms 218 and 222, the net resultant of which is an upward force, is a measure of the rate of flow of fuel to the engine, since it represents the pressure drop across the jet system 60. The injector pumps are therefore controlled by the valve 228 and servo-motor 242 to maintain the fuel flow proportional to the air flow.

As the throttle approaches closed position, the cam 192 moves the valve 182 to closed position, and at the same time cam 212 positions the spring retainer 210 so that it begins to close the port 199 and permit a flow of fuel thru the idle control 196. The operation of the idle control, per se, is substantially the same as the operation of the idle control 130 of Figure 1. The pressure differential across the restriction 206 is therefore determined by the contour of cam 212 and the position of throttle 152.

Valve 228 is now positioned in accordance with four different forces: (1) the air pressure differential acting downwardly on diaphragm 174; (2) the fuel pressure differential across the metering restriction 206, port 199 and the jet system 60 in series, which acts thru the diaphragms 218 and 222 in an upward or fuel flow decreasing direction; (3) the fuel pressure differential across the metering restriction 206, which acts downwardly on diaphragm 232 or in a fuel flow increasing direction; (4) the spring 221, which also acts in a fuel flow increasing direction.

A condition of equilibrium of valve 228 is reached when the total fuel pressure differential across the metering restriction 206, port 199 and the jet system 60 in series, acting on the smaller diaphragms 218 and 222, balances the smaller fuel pressure differential across orifice 206, which is acting on the slightly larger diaphragm 232. The force of spring 221 and the air pressure differential acting on diaphragm 378 are relatively small as compared to the two fuel pressure differentials, and may be neglected.

Since the fuel pressure differential across restriction 206 is held constant by the valving action of piston 204 and port 199, it follows that the control device operates the injector pump delivery control to maintain a constant total fuel pressure differential across orifice 206, port 199 and jet system 60 in series. The result is that the valve 228 is restored to its neutral position when the injector pump delivery control mechanism has been set so that the injector pumps deliver fuel at exactly the same rate as it passes thru orifice 206.

*Figure 3*

There is illustrated in Figure 3 an alternative mechanism which may be used to vary the tension of the spring which acts to control the idle valve, which means may be used in place of the throttle-connected linkage of Figures 1 and 2.

There is shown in Figure 3 a fuel conduit 300 leading to a valve 302 which is the equivalent of the valve 180 of Figure 2. Fuel passing the valve 302 is discharged thru a conduit 304. Valve 302 is by-passed by a connection including a conduit 306, an idle control 308, and a conduit 310. The idle control 308 includes a cylinder 312, in which a piston 314 is movable. Piston 314 has a central metering orifice 309, and cooperates with a port 307 to control the fuel flow thru idle control 308. The piston 314 is balanced between two springs 316 and 318. The upper spring 316 engages a retainer 320, which is carried on the end of a rod 322.

A conventional type of air induction system including a venturi 324, a throttle 326 and a supercharger 328 is provided. A casing 330 is divided internally into two expansible chambers 332 and 334 by a diaphragm 336. Chamber 332 is connected thru a conduit 338 to the air induction system at the inlet side of the supercharger, and chamber 334 is connected thru a conduit 340 to the air induction system at the discharge side of the supercharger. A bellows 342 is mounted on the diaphragm 336. The opposite end of bellows 342 is attached to the rod 322. If desired, bellows 342 may be filled at least partially with a fluid having an appreciable coefficient of thermal expansion, so that bellows 342 expands and contracts as a function of the density in the manifold 328.

The force applied to piston 314 by the spring 316, and hence the rate of flow of fuel to the engine under idling conditions, is controlled by the position of rod 322. This rod is positioned by the diaphragm 336, which responds to the pressure rise across the supercharger and by the bellows 342, which responds to the absolute pressure on the discharge side of the supercharger. The pressure rise across the supercharger is a measure of the speed of the engine, since the supercharger is driven by the engine. It may therefore be stated that the idle control 308 is operated in accordance with the engine speed and the manifold density. If desired, the diaphragm 336 and bellows 342 could be replaced by equivalent mechanisms responsive to the engine speed and the manifold density.

Considering the operation when valve 302 is closed, it may be seen that as speed increases or as manifold density increases, the rod 322 is moved upwardly, decreasing the spring force acting downwardly on piston 314. The piston 314 therefore moves upwardly, opening the port 307 leading to conduit 306 wider and increasing the fuel flow thru restriction 309. The upward movement of piston 314 continues until the increased pressure drop across restriction 309, due to the increased flow, provides a downward force to balance the decrease in downward force caused by movement of rod 322.

Therefore, in the arrangement of Figure 3, the fuel flow is controlled in response to engine speed and manifold density when valve 302 is closed because of closure of the the throttle. This arrangement prevents "leaning out" of the fuel-air mixture during descent with throttle closed, since it takes into account the engine speed and manifold density and does not control the fuel flow arbitrarily in accordance with throttle position.

*Figure 4*

There is shown in Figure 4 an alternative form of mechanism for controlling a servo-motor which may be used in place of the control device 168 of Figure 2. In Figure 4, the idle control 196 and the valve 182 are the same as the corresponding elements in Figure 2. A fixed restriction 350 in the fuel conduit is intended as a schematic representation of a structure corresponding in function to the jet system 60 of Figure 2.

In Figure 4, the fuel passes thru an inlet conduit 352, valve 182, a conduit 354, the restriction 350 and a conduit 356. The valve 182 is by-passed by a connection thru conduits 358, idle control 196, conduit 360 and a conduit 362.

The servo-motor valve controlling device is generally indicated at 364. It consists of a housing 366 divided into four expansible chambers 368, 370, 372 and 374, by three flexible diaphragms 376, 378 and 380. An air pressure differential, which is a measure of the mass of air flowing to the engine per unit time, is communicated to the chambers 372 and 370 by conduits 382 and 384 which correspond to conduits 164 and 170 of Figure 2. The chamber 374 is connected by a conduit 386 to the fuel conduit 356 at the downstream side of the main metering restriction 350. The chamber 368 is connected thru conduits 388 and 362 to the conduit 354 on the upstream side of restriction 350.

The diaphragms 376, 378 and 380 are attached at their centers to the stem 392 of a spool valve 394 which moves in a cylinder 396. A chamber 398 is formed in the cylinder 396 between the end of the valve 394 and the end of the cylinder. This chamber 398 is connected thru conduit 358 to the inlet fuel conduit 352.

When the engine is operating under power output conditions the valve 182 is open and the pressure in chamber 398 is the same as that in chamber 368. The valve is then operated in response to the unbalance between the air pressure differential indicative of the air flow to the engine and the fuel pressure differential across metering restriction 350, which is indicative of fuel flow to the engine.

When the valve 182 is closed, the pressure differential between chambers 368 and 374 is very small, whereas the pressure differential between the chambers 398 and 374 is the total fuel pressure differential across the valve 182 and the restriction 350 in series. Under these conditions the position of valve 394 is controlled substantially in accordance with the spring 390 acting in a fuel flow increasing direction and the fuel pressure differential across the valve 182 and restriction 350 in series acting in a flow decreasing direction. Since the force of spring 390 is substantially constant, the valve 394 controls the injector pumps to maintain a constant pressure drop thru the entire system while the fuel flow is regulated by the idle control 196.

It may be stated in other words, that the valve 394 controls the injector pumps to deliver fuel at the same rate that it flows thru idle control 196, which condition is necessary if a constant pressure drop across the entire system is to be maintained. As in the previous modifications, it may be seen that the closure of the valve 182 is effective to transfer control of the fuel metering from the large restriction 350 to the small restriction 206.

The valve 394 controls the flow of fuel to a servo-motor such as that indicated at 242 in Figure 2, in a well-known manner. The motive fluid for this motor is the fuel itself being supplied either thru the chamber 368 or thru a conduit 400. A conduit 402 provides a drain connection for fluid discharged by the servo-motor.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, means for operating said first valve to an open position when the engine power output is greater than a predetermined value and to closed position when the engine power output is less than said value, said second valve being operated, when said first valve is closed, to regulate said pressure drop, and hence the flow of fuel to said engine, at a value determined by said force varying means, first fuel control means effective to produce a first increment of fuel flow in response to a given increment of engine power output for regulating the flow of fuel when said first valve is open, and second fuel control means responsive to changes in engine power output for operating said force varying means to produce a higher increment of fuel flow in response to an equal increment of power output.

2. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine when said first valve is open, and means for closing and opening said first valve to selectively place said force varying means in or out of control of the fuel flow.

3. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, a throttle for controlling the flow of combustion air to said engine, and means responsive to the position of said throttle for operating said first valve to closed position when said throttle is in a range of positions near its closed position and to open position when said throttle is outside said range.

4. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, a throttle for controlling the flow of combustion air to said engine, means responsive to the position of said throttle for operating said first valve to closed position when said throttle is in a range of positions near its closed position and to open position when said throttle is outside said range, and means responsive to the position of said throttle for operating said force varying means.

5. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a throttle for controlling the flow of combustion air to said engine, and means responsive to the position of said throttle for operating said force varying means.

6. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a supercharger driven by said engine for increasing the pressure in the intake manifold thereof, and means responsive to the pressure rise across said supercharger for operating said force varying means.

7. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a supercharger driven by said engine for increasing the pressure in the intake manifold thereof, a first control device responsive to the pressure rise across said supercharger, a second control device responsive to the absolute pressure on one side of said supercharger, and means including both said devices for operating said force varying means.

8. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a first control device responsive to engine speed, a second control device responsive to changes in intake manifold pressure, and means including both said control devices for operating said force varying means.

9. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a control device responsive to engine speed, and means including said control device for operating said force varying means.

10. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for operating said first valve to an open position when the engine power output is greater than a predetermined value and to closed position when the power output is less than said value, a control device responsive to changes in intake manifold pressure, and means including said control device for operating said force varying means.

11. A fuel supply system for an internal combustion engine, comprising a conduit for said fuel, a valve associated with said conduit for controlling the flow of fuel therethru under engine idling conditions, said valve being substantially ineffective to control the fuel flow when the engine is developing more than a predetermined power output, a supercharger driven by said engine for increasing the pressure in the intake manifold thereof, and means responsive to the pressure rise across said supercharger for operating said valve.

12. A fuel supply system for an internal combustion engine, comprising a conduit for said fuel, valve associated with said conduit for controlling the flow of fuel therethru under engine idling conditions, said valve being substantially ineffective to control the fuel flow when the engine is developing more than a predetermined power output, a supercharger driven by said engine for increasing the pressure in the intake manifold thereof, a first control device responsive to the pressure rise across said supercharger, a second control device responsive to the absolute pressure on one side of said supercharger, and means including both said devices for operating said valve.

13. A fuel supply system for an internal combustion engine, comprising a conduit for said fuel, a valve associated with said conduit for controlling the flow of fuel therethru under engine idling conditions, said valve being substantially ineffective to control the fuel flow when the engine is developing more than a predetermined power output, a first control device responsive to engine speed, a second control device responsive to changes in manifold pressure, and means including both said control devices for operating said valve.

14. A fuel supply system for an internal combustion engine, comprising a conduit for said fuel, a valve associated with said conduit for controlling the flow of fuel therethru under engine idling conditions, said valve being substantially ineffective to control the fuel flow when the engine is developing more than a predetermined power output, a control device responsive to engine speed, and means including said control device for operating said valve.

15. An internal combustion engine, having a throttle for controlling the combustion air supply thereto, a fuel supply system comprising a conduit for said fuel, a valve associated with said conduit for controlling the flow of fuel therethru under engine idling conditions, said valve being substantially ineffective to control the fuel flow when the engine is developing more than a predetermined power output, a control device responsive to changes in manifold pressure, and means including said control device for mechanically operating said valve from the throttle.

16. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, and means responsive to the rate of flow of combustion air to said engine for operating said first valve.

17. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, and becoming increasingly effective as said first valve approaches its closed position, means responsive to the rate of flow of combustion air to said engine for applying to said first valve a force proportional to said rate of flow and acting in a valve opening direction, means responsive to the rate of flow of fuel to said engine for applying to said first valve a force proportional to said rate of fuel flow and acting in a valve closing direction, a throttle for controlling the flow of combustion air to said engine, and means connected to said throttle for operating said force varying means and effective when said throttle is in a range of positions adjacent its closed position to increase the rate of fuel flow thru said by-pass conduit sufficiently so that said fuel flow responsive means may overcome said air flow responsive means and close said first valve, thereby placing said force varying means in sole control of the rate of fuel flow.

18. A fuel supply system for an internal combustion engine, comprising a conduit for fuel flowing to said engine, a first valve in said conduit, a by-pass conduit extending around said valve, a fixed restriction and a second valve connected in series in said by-pass conduit, means responsive to the pressure drop across said restriction for operating said second valve in a closing direction upon an increase in said pressure drop, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, and becoming increasingly effective as said first valve approaches its closed position, means responsive to the rate of flow of combustion air to said engine for applying to said first valve a force proportional to said rate of flow and acting in a valve opening direction, means responsive to the rate of flow of fuel to said engine for applying to said first valve a force proportional to said rate of fuel flow and acting in a valve closing direction, and means for operating said force varying means to increase the rate of fuel flow thru said by-pass conduit sufficiently so that said fuel flow responsive means may overcome said air flow responsive means and close said first valve, thereby placing said force varying means in sole control of the rate of fuel flow.

19. In a fuel supply system for an internal combustion engine, apparatus for controlling the fuel flow under engine idling conditions, comprising a fuel conduit, a fixed restriction and a valve in series in said fuel conduit, means responsive to the pressure drop across said restriction for operating said valve in a closing direction, spring means opposing said pressure drop responsive means, and means for varying the force of said spring means and thereby controlling the fuel flow thru said conduit.

20. In a fuel supply system for an internal combustion engine, apparatus for controlling the fuel flow under engine idling conditions, comprising a fuel conduit, a fixed restriction and a valve in series in said fuel conduit, means responsive to the pressure drop across said restriction for operating said valve in a closing direction, spring means opposing said pressure drop responsive means, a throttle for controlling the flow of combustion air to said engine, and means responsive to the position of said throttle for varying the force of said spring means and thereby controlling the flow of fuel thru said conduit.

21. In a fuel supply system for an internal combustion engine, apparatus for controlling the fuel flow under engine idling conditions, comprising a fuel conduit, a fixed restriction and a valve in series in said fuel conduit, means responsive to the pressure drop across said restriction for operating said valve in a closing direction, spring means opposing said pressure drop responsive means, and means responsive to the pressure in the intake manifold of said engine for varying the force of said spring means and thereby controlling the flow of fuel thru said conduit.

22. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including diaphragm means responsive to the pressure drop across said first valve and said main metering restriction in series, said control means being effective when said first valve is closed to operate said delivery varying means so that said injector pump mechanism delivers all the fuel passed by said second restriction, and means for closing and opening said first valve to selectively place said force varying means in or out of control of the fuel flow.

23. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including first diaphragm means responsive to the pressure drop across said first valve and said main metering restriction in series, and second diaphragm means larger than and opposing said first diaphragm means, said second diaphragm means being responsive to the pressure drop across said second restriction only, so that when said first valve is open said first diaphragm means responds to the pressure drop across said main restriction and said second diaphragm means is ineffective and when said first valve is closed both said diaphragm means are effective, and means for closing and opening said first valve to selectively place said force varying means in or out of control of said motor means.

24. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including a diaphragm responsive to the pressure drop across said second metering restriction, said diaphragm being ineffective when said first valve is open because of the absence of any pressure drop across said second restriction, and being effective when said first valve is closed to operate said control means in accordance with the pressure drop across said second smaller restriction and thereby in accordance with said force varying means, and means for closing and opening said first valve to selectively place said force varying means in or out of control of said motor means.

25. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, means for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including first diaphragm means responsive to the pressure drop across said first valve and said main metering restriction in series, second diaphragm means larger than and aiding said first diaphragm means and responsive to the pressure drop across said main metering restriction, so that when said first valve is open both said diaphragm means respond to the pressure drop across said main restriction and when said first valve is closed said second diaphragm means is ineffective because of the substantial absence of a pressure drop across said main metering restriction, and means for closing and opening said first valve to selectively place said force varying means in or out of control of said motor means.

26. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, a throttle for controlling the flow of combustion air to said engine, means responsive to the position of said throttle for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including diaphragm means responsive to the pressure drop across said first valve and said main metering restriction in series; and means for closing said first valve as said throttle approaches closed position to place said force varying means in control of said motor means.

27. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, a first control device responsive to engine speed, a second control device responsive to changes in manifold pressure, means including both said control devices for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including diaphragm means responsive to the pressure drop across said first valve and said main metering restriction in series so that when said first valve is open said diaphragm means responds to the pressure drop across said main restriction and when said first valve is closed said diaphragm means responds to the pressure drop across said second smaller restriction and thereby to said force varying means, and means for closing and opening said first valve to selectively place said force varying means in or out of control of said motor means.

28. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering restriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, a throttle for controlling the flow of combustion air to said engine, means responsive to the position of said throttle for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including a diaphragm responsive to the pressure drop across said second metering restriction, said diaphragm being inffective when said first valve is open because of the absence of any pressure drop across said second restriction, and being effective when said first valve is closed to operate said control means in accordance with the pressure drop across said second smaller restriction and thereby in accordance with said force varying means, and means for closing said first valve as said throttle approaches closed position to place said force varying means in control of said motor means.

29. A fuel supply system for an internal combustion engine, comprising injector pump mechanism for delivering fuel to the cylinders of said engine, a conduit for conveying fuel to said pump mechanism, a main metering restriction in said fuel conduit, a first valve in series with said main metering restriction, a by-pass conduit extending around said valve, a second metering retriction appreciably smaller than said main restriction and a second valve connected in series in said by-pass conduit, means responsive to the pressure drop across said second restriction for operating said second valve in a closing direction as said pressure drop increases, means for applying to said second valve a force acting in opposition to said pressure drop, a first control device responsive to engine speed, a second control device responsive to intake manifold pressure, means including both said control devices for varying said force, said second valve being operated, when said first valve is closed, to regulate said pressure drop, and hence the flow of fuel to said engine, at a value determined by said force varying means, said second valve being substantially ineffective to control the flow of fuel to said engine when said first valve is open, means for varying the delivery of said injector pump mechanism, motor means for operating said delivery varying means, and control means for said motor means including a pair of expansible chambers separated by a common movable wall, means connecting said chambers to said fuel conduit so that said wall is responsive to the pressure drop across said first valve and said main metering restriction in series so that when said first valve in open said wall responds to the pressure drop across said second smaller restriction and thereby to said force varying means, and means for closing and opening said first valve to selectively place said force varying means in or out of control of said motor means.

LEIGHTON LEE, II.

REFERENCES CITED

The following references are of record in the file of this patent:

UNITED STATES PATENTS

| Number | Name | Date |
|---|---|---|
| 2,415,491 | Hieger | Feb. 11, 1947 |
| 2,420,079 | Holley | May 6, 1947 |